May 12, 1959
D. D. PETTIGREW
2,885,897
LATHE DRIVE
Filed Nov. 21, 1955
8 Sheets-Sheet 6
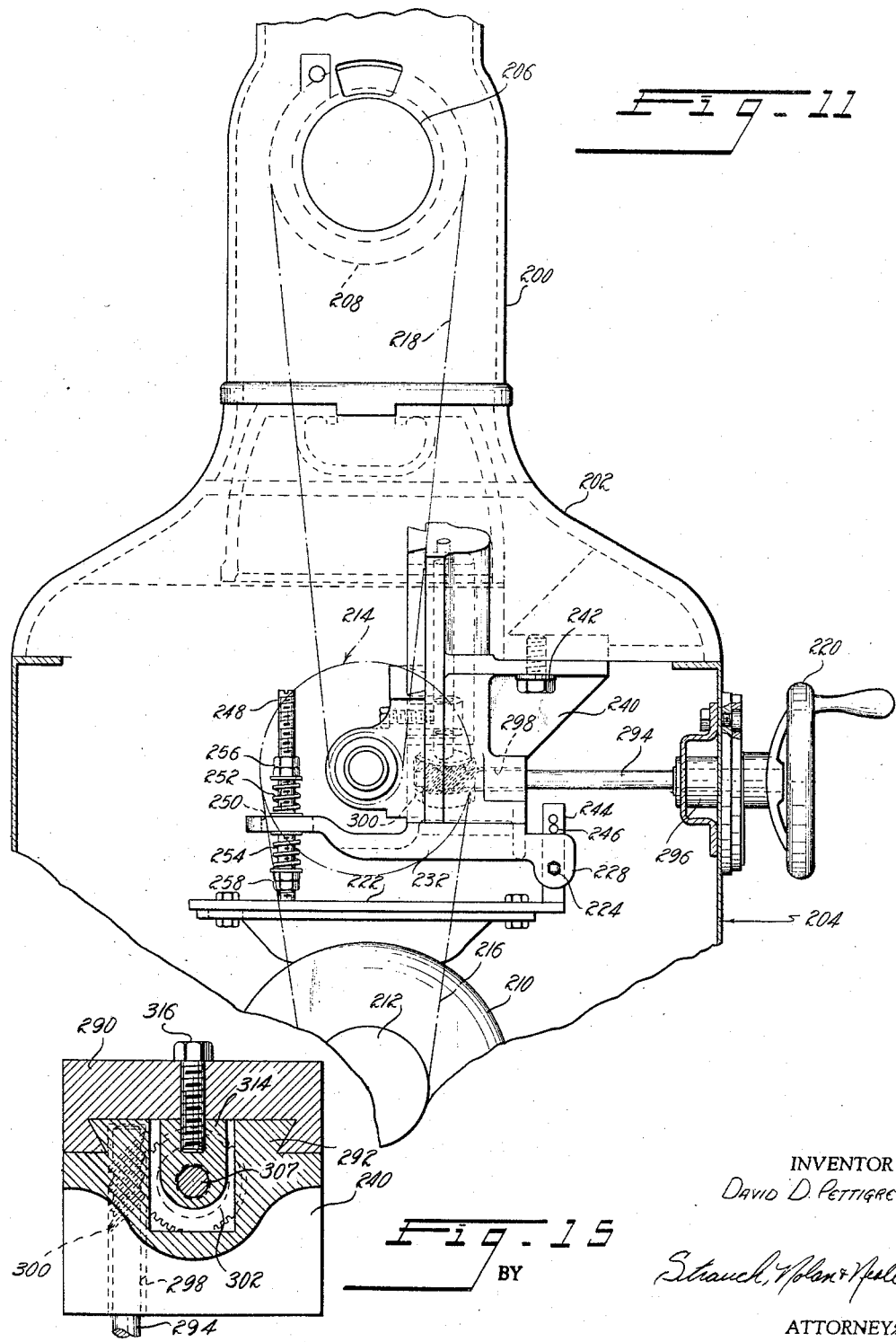
INVENTOR
David D. Pettigrew
BY Strauch, Nolan & Neale
ATTORNEYS May 12, 1959 D. D. PETTIGREW 2,885,897
LATHE DRIVE
Filed Nov. 21, 1955 8 Sheets-Sheet 7
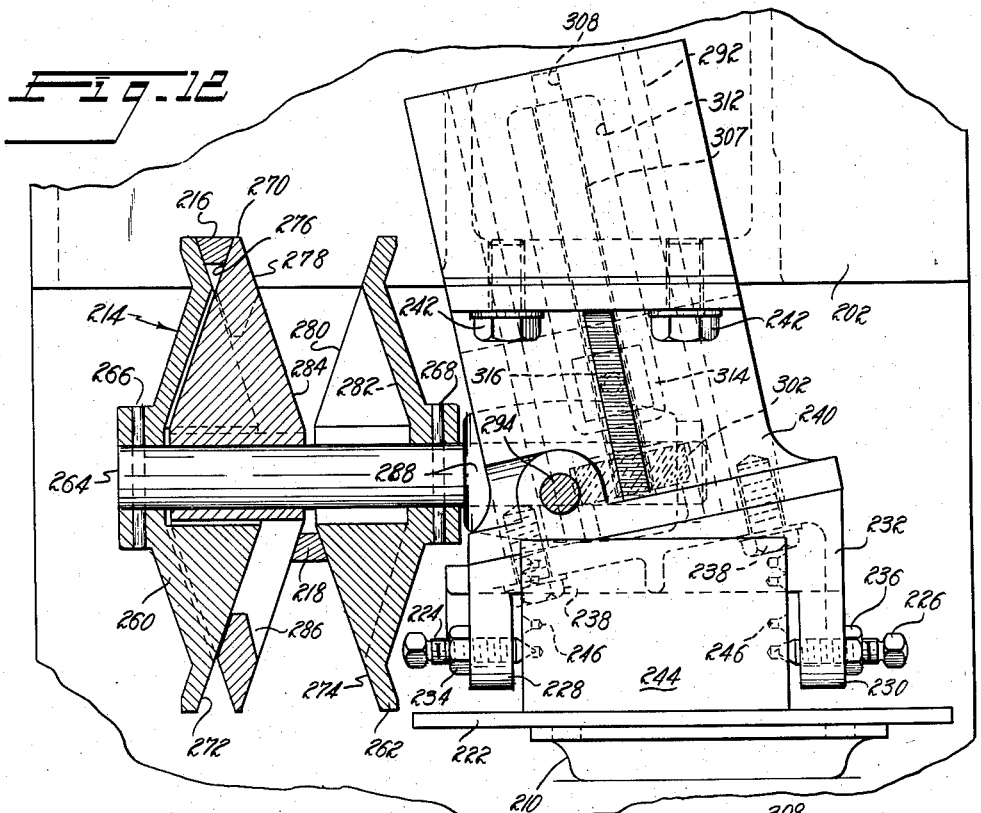
Fig. 12
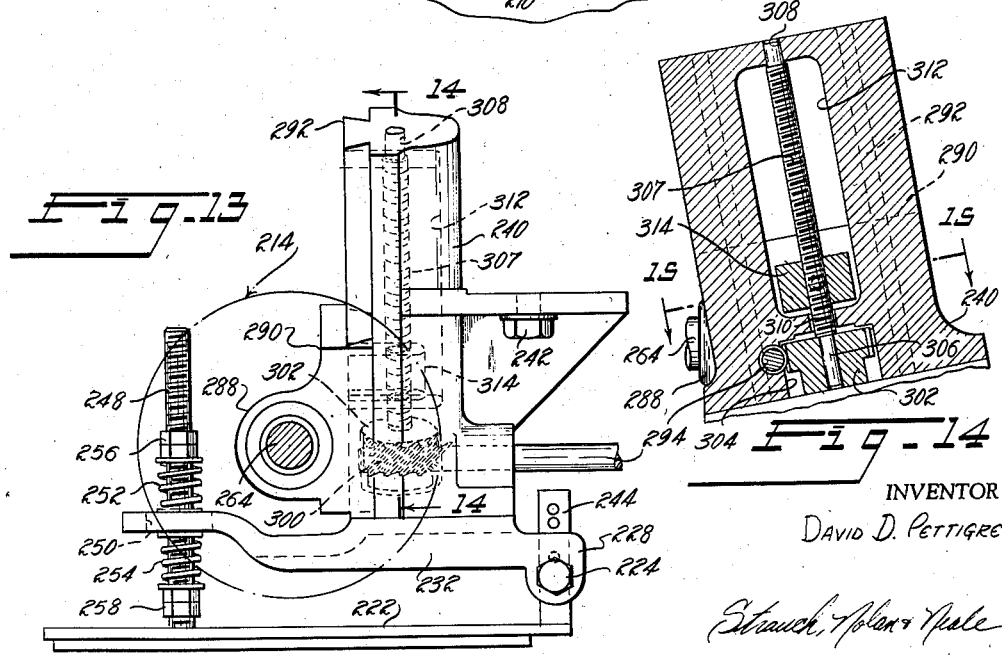
Fig. 13
Fig. 14
INVENTOR
DAVID D. PETTIGREW
ATTORNEYS

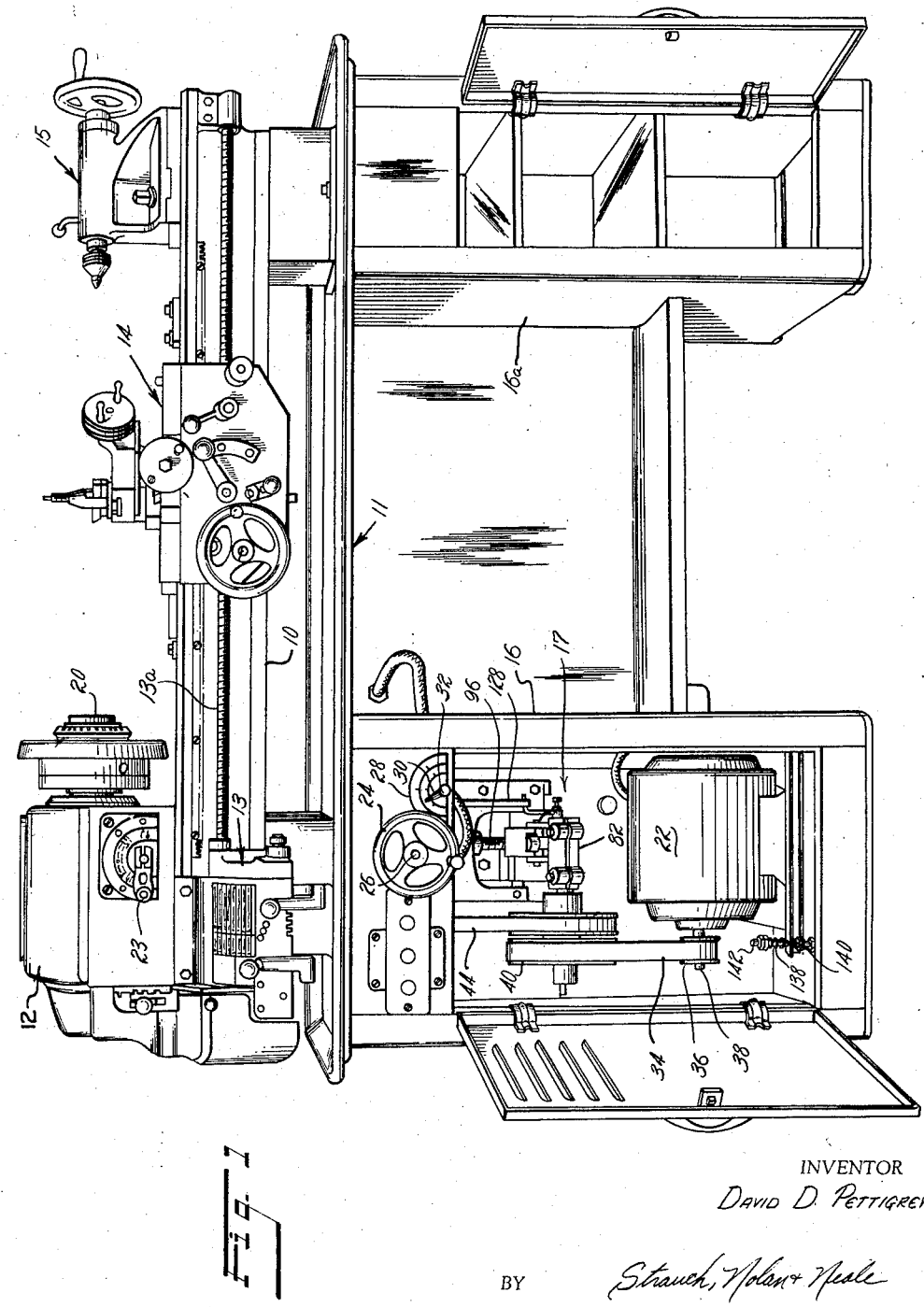

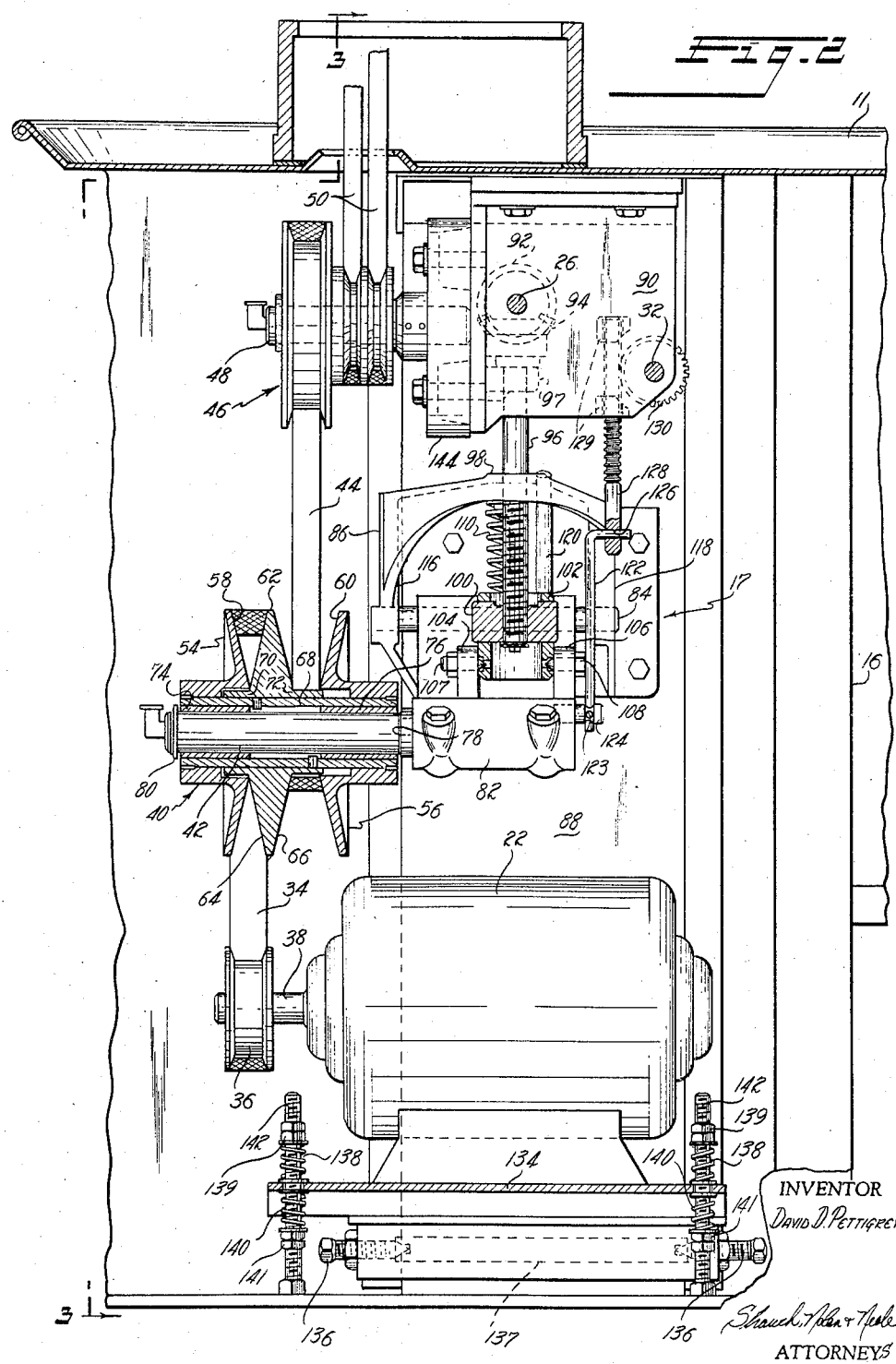

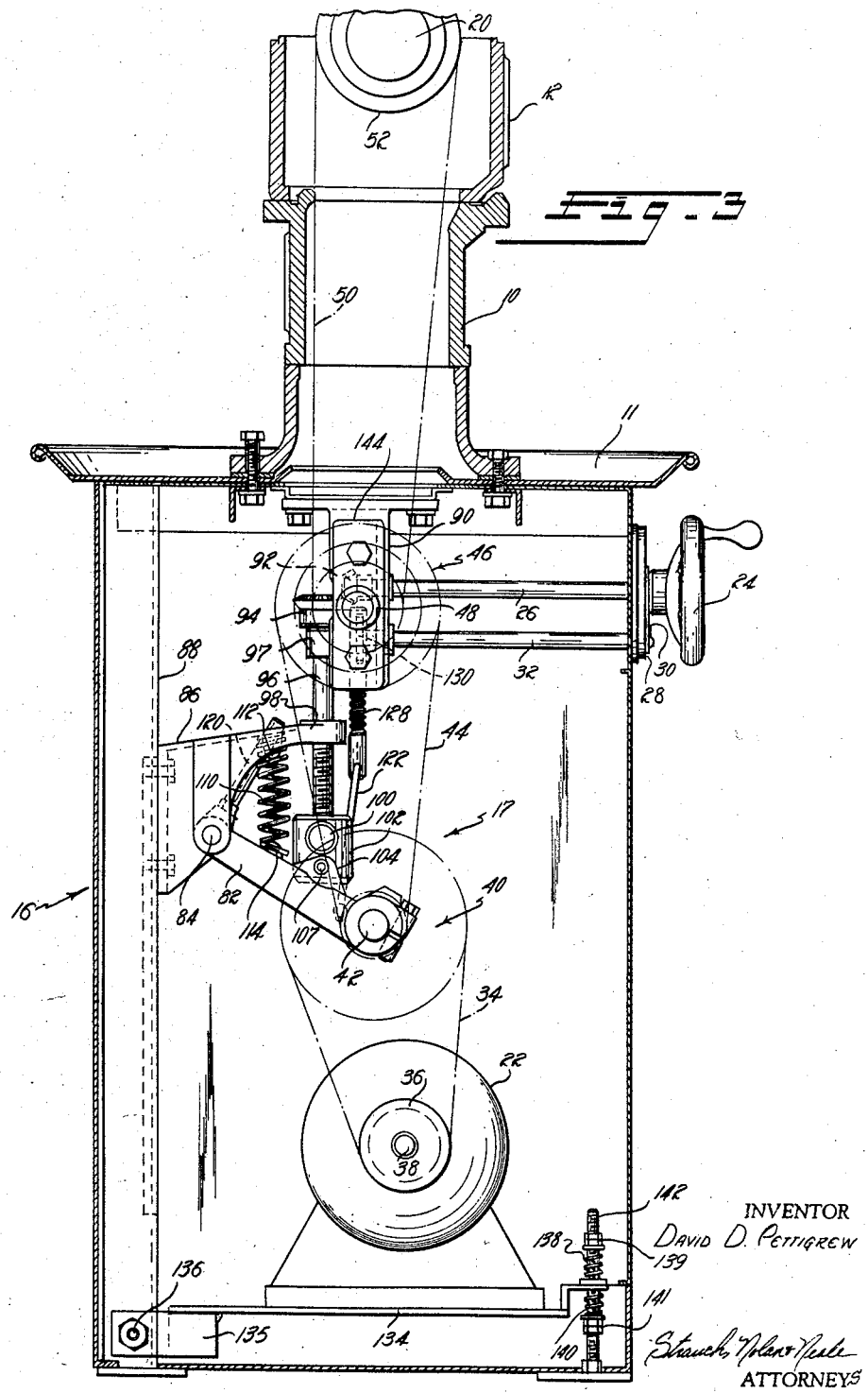

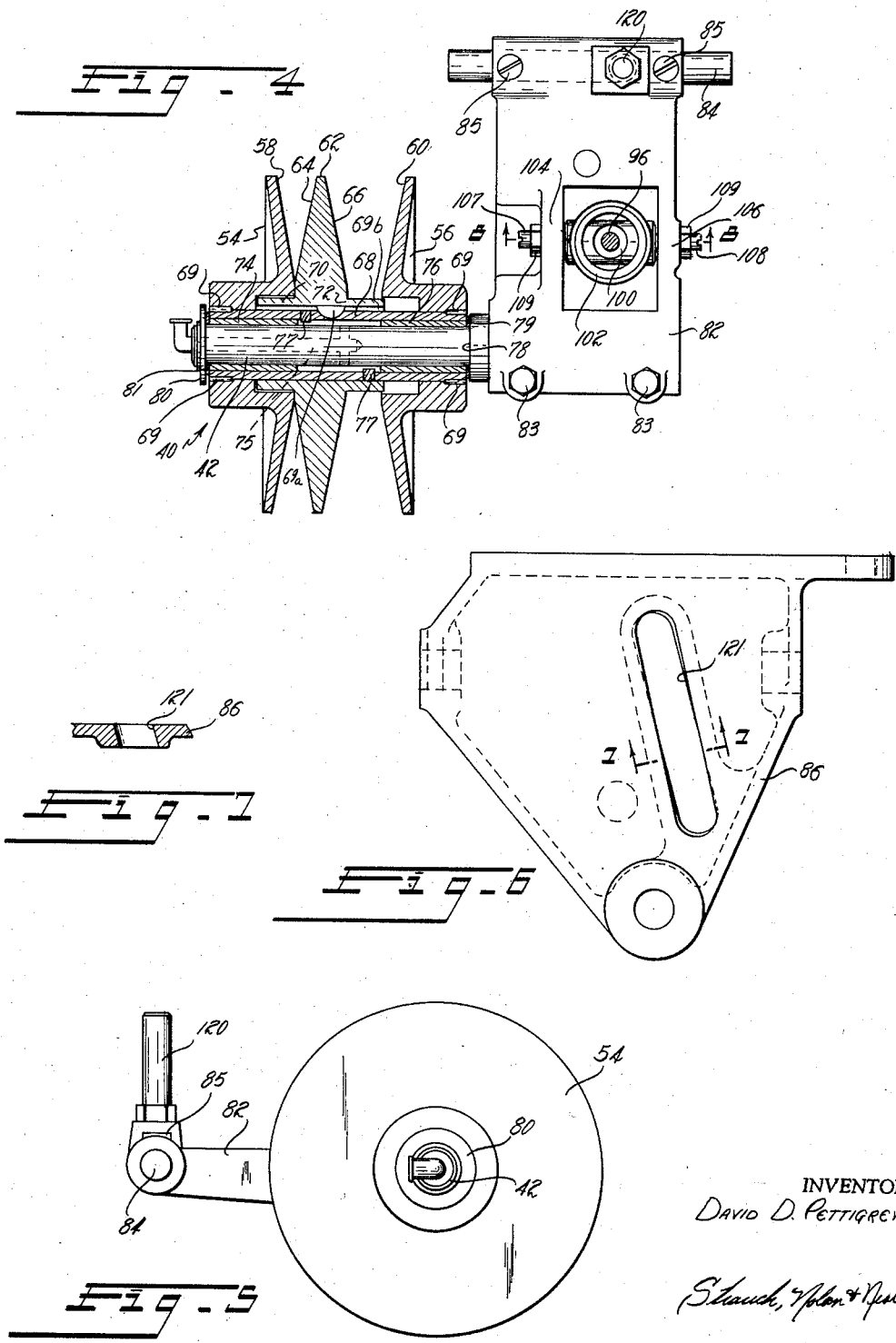

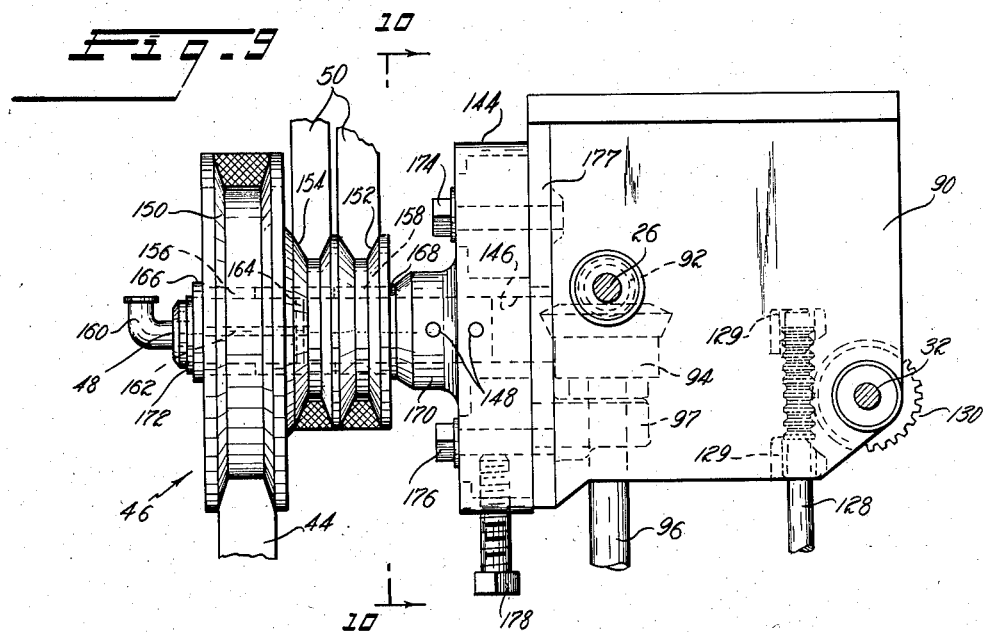

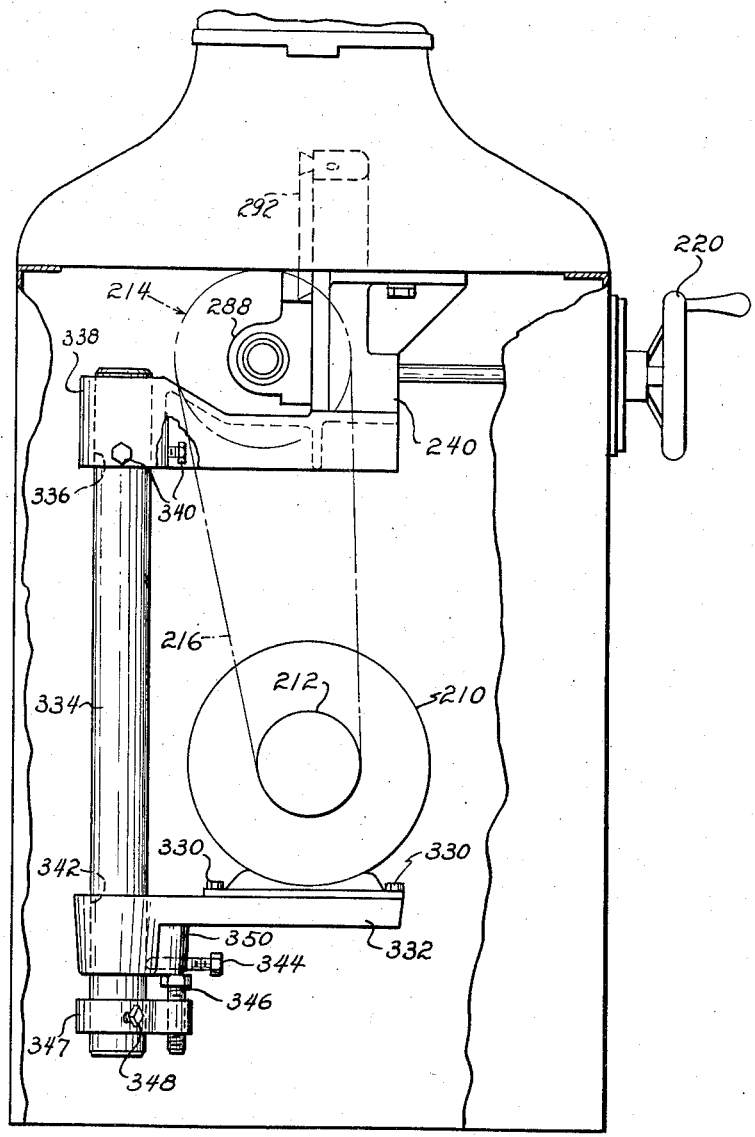

United States Patent Office 2,885,897
Patented May 12, 1959

2,885,897
LATHE DRIVE

David D. Pettigrew, Pittsburgh, Pa., assignor to Rockwell Manufacturing Company, Pittsburgh, Pa., a corporation of Pennsylvania Application November 21, 1955, Serial No. 548,086

4 Claims. (Cl. 74—230.17)

The present invention relates to improvements in drive trains for metal cutting and wood working machines such as lathes and more particularly to improvements in vari-speed pulley type speed changers adapted to provide an infinite speed selection within a predetermined range for such machines.

While for many years variation of the drive spindle speed of belt driven lathes and other machine tools was effected through step cone pulley arrangements and gearing, in recent years, efforts have been made to provide a spindle drive train which permits accurate adjustment to any desired speed within a predetermined range. These efforts have been directed toward incorporation of a variable speed V-belt type drive, known as a vari-speed pulley assembly, in the spindle drive train. Examples of such efforts are found in U.S. Patent No. 2,695,529 issued November 30, 1954 to L. R. Evans for Variable-Speed Transmission Mechanism and in copending application Serial No. 319,243 entitled Power Transmission Mechanism, filed November 7, 1952 by Eric A. Reibig, now Patent No. 2,773,395 dated December 11, 1956.

In V-belt type variable speed drive trains, if proper alignment of the input and output belts of the vari-speed pulley assembly is to be maintained throughout the range of speed selection, it is necessary to impart axial displacement to the variable speed pulley assembly shaft concomitantly with the lateral displacement of the assembly that effects the speed variation. In vari-speed pulley assemblies generally, various expedients have been devised for effecting this concomitant lateral and axial displacement of the vari-speed pulley assembly. The mechanism shown in U.S. Patent No. 2,503,462 issued April 11, 1950 to A. Wyzenbeek for Variable-Speed Transmission Device is typical of such expedients.

In metal and similar power tools, it is necessary to make relatively frequent adjustments of the spindle speed to accommodate differences in hardness of the workpieces and dulling of the cutting tools, particularly in metal working machines. As a consequence, it is highly desirable that the variable speed drive train in such machines not only be adapted for ready adjustment to minimize loss of time by the operators but that it be capable of maintaining its adjusted speed ratio to minimize gouging of the workpiece and tool damage that speed fluctuations often cause. Insofar as the vari-speed pulley assemblies heretofore proposed are concerned, the shifting mechanisms provided for effecting the lateral and axial movements of the vari-speed pulley assemblies necessary to effect speed changes and belt alignment have been incapable of maintaining a selected speed ratio and proper belt alignment. This shortcoming of the prior devices has resulted in noisy operation because of periodic high frequency axial movement of the pulley components, rapid wear of the drive belts due to such movements and alternate speeding up and slowing down of the driven tool spindle causing work spoilage, particularly in metal cutting machines, through gouging of the workpiece and rapid dulling of the cutting tool. As a consequence, the vari-speed pulley assembly has not been widely accepted in the machine tool art by manufacturers who aim to produce high quality home workshop and low cost machine tools where its simplicity and low manufacturing cost has its greatest appeal.

It is the primary object of the present invention to provide in a lathe or similar machine tool, a vari-speed pulley assembly type of drive train speed changer which retains the characteristic ease and quick adjustment features of such devices within a predetermined range and which is so constructed as to avoid speed fluctuations and misalignment of the input and output belts of the vari-speed pulley assembly through the designed range of speed adjustment.

More specifically, it is an object of the present invention to provide, in a lathe or similar machine, a vari-speed pulley type of drive train speed changer which may be easily and quickly adjusted to any selected speed within a predetermined range and which is effective to impart controlled concomitant lateral and axial displacement to the vari-speed pulley assembly during speed adjustment thereof while minimizing noisy and inefficient operation and avoiding misalignment of the driving and driven belts thereof.

A further object of this invention is to provide a vari-speed pulley type of drive train speed changer which may be easily and quickly adjusted to any selected speed in a predetermined range through manipulation of a non-over-running positioning linkage through which a desired speed can be selected and maintained without the use of a locking device and which is effective to impart controlled concomitant and lateral and axial displacement to the vari-speed pulley assembly during speed adjusting movement thereof and after adjustment to maintain the selected speed without fluctuations and misalignment of the driving and driven belts.

As is pointed out in detail in an application designated Metal Cutting Machine Lathe, Serial No. 541,921 owned by the assignee hereof and filed October 21, 1955 in the name of Eric A. Reibig (now abandoned), in metal cutting lathes and similar machines, it is particularly desirable, due to the low spindle speed requirements of such machines, to provide a mechanism forming a stage of speed reduction isolating the variable speed V-belt type pulley assembly from the spindle. Such a stage is formed by interposing a step pulley assembly in the drive train between the vari-speed pulley assembly and the spindle. Due to the load on the belts driven by this step pulley assembly, the belts wear relatively rapidly so that it becomes necessary from time to time to replace them. In drive trains of this type, as heretofore constructed, the initial installation and the replacement of these belts has been quite difficult and time consuming because the step pulley assembly, which must be located in a relatively inaccessible place adjacent the bottom of the lathe bed and behind the speed adjustment controls where the individual mounting it or removing it must work practically entirely by the sense of touch rather than being able to see that on which he is working, can be mounted only after the belts are in place and must be removed for belt replacement.

It is, therefore, a further important object of this invention to provide, in a lathe or other machine tool having a multiple stage, V-belt type, variable speed drive train with the speed reducing stage isolating the machine spindle from the variable speed pulley assembly, a step pulley mounting structure of such improved construction that the step pulley can be mounted and removed rapidly and readily for belt installation and replacement purposes.

These and other objects of the present invention will become more fully apparent by reference to the appended claims as the following detailed description proceeds in reference to the accompanying drawings wherein:

Figure 1 is a perspective view of a metal cutting lathe which is typical of a metal cutting machine installation in which the present invention has particular utility;

Figure 2 is an enlarged front view, partially in section, showing the lower portion of the variable speed head stock spindle drive train of Figure 1;

Figure 3 is a left side view of the variable speed drive train of Figure 1;

Figure 4 is an enlarged view partially in section, of the vari-speed pulley assembly and the pivoted mounting bracket therefor;

Figure 5 is an enlarged right end view of the vari-speed pulley assembly and mounting structure therefor shown in Figure 4;

Figure 6 is a top plan view of the fixed support of the the vari-speed pulley assembly mounting structure;

Figure 7 is a fragmentary sectional view along line 7—7 of Figure 6;

Figure 8 is a fragmentary sectional view taken along the line 8—8 of Figure 4;

Figure 9 is a fragmentary enlarged view of the second intermediate or jackshaft idler pulley assembly and the mounting structure therefor of the drive train shown in Figures 2 and 3;

Figure 10 is a fragmentary sectional view taken along the lines 10—10 of Figure 9;

Figure 11 is a side elevation view partly in section showing a variable-speed V-belt type drive train for a wood-working lathe constituting a second embodiment of the present invention;

Figure 12 is a front view of a portion of the mechanism shown in Figure 11;

Figure 13 is an enlarged view of a portion of Figure 11;

Figure 14 is a sectional view taken along the line 14—14 of Figure 13;

Figure 15 is a fragmentary sectional view taken along the line 15—15 of Figure 14; and Figure 16 is a fragmentary view similar to Figure 11 illustrating a modified and preferred form of motor mount for the type device of Figures 11 to 15.

Referring now more particularly to the drawings and especially to Figure 1, the principal components of the metal cutting lathe assembly there shown are the lathe bed 10 mounted on a suitable support frame 11, the lathe head stock 12 mounted on the left end of lathe bed 10, the tool feed control box 13 attached to the side of the tool bed and operatively connected through the feed screw 13a to the tool carrying mechanism 14, and the tail stock 15 mounted on the bed in the usual manner. Opposite ends of the frame 11 are supported on pedestals 16 and 16a, the latter providing a convenient storage space and the former housing a variable speed head stock spindle drive mechanism indicated generally at 17. Of these components, the present invention is concerned primarily with improvements in the variable speed head stock spindle drive mechanism 17. Further details of the general lathe structure are described in said copending application of Eric A. Reibig Serial No. 319,243 filed November 7, 1952 for Power Transmission Mechanism, now Patent No. 2,773,395. Reference is made to this application in the event that further details of the general lathe structure are found to be desirable as background to a complete understanding of the present invention hereinafter described in detail.

A head stock spindle 20 is conventionally journalled in the casting for the head stock 12, and may be driven from the motor 22 through the variable speed drive train 17 at any of an infinite number of speeds within a predetermined range. As fully explained in said copending application, back gearing (not shown), selectively actuated under control of control lever 23 provides two ranges of speeds, from 220 to 1550 r.p.m. for direct direct drive of the spindle 20 and from 45 to 240 r.p.m. in back gear drive. The selection of the speed of spindle 20 within the set two ranges is effected by rotary manipulation of the hand wheel 24 which is fixed to a shaft 26. The selected speed is indicated by an indicator formed by an indicator plate 28, mounted on the front face of the pedestal 16, in cooperation with a pointer 30 fixed to a rotatably mounted shaft 32. The drive train 17 and the mechanism for controlling the speed selection through rotary actuation of the shaft 26 and the mechanism for controlling the movement of the indicator pointer 30 through rotary action of the shaft 32 is illustrated in detail in Figures 2 and 3 with reference to which the detailed description of the invention will continue.

As illustrated in Figures 2 and 3, the drive train for spindle 20 comprises, in this embodiment of the invention, a three stage belt drive which is the invention of one Eric Reibig disclosed in said application Serial No. 541,921 of the assignee of this application. The first stage is formed by a V-belt 34 drive connecting a pulley 36 fixed to the shaft 38 of the rotor (not shown) of the drive motor 22 and a V-belt vari-speed pulley assembly 40 mounted for rotation about the axis of a shaft 42 which is supported for controlled concomitant lateral and axial displacement in a manner which will be described hereinafter. The second stage of the belt drive is formed by a V-belt 44 drive connecting the output of the vari-speed pulley assembly 40 with the large diameter input pulley of the step pulley assembly 46 which is mounted for rotation about a rigidly supported shaft 48. The third stage of the belt drive is formed by a pair of V-belts 50 drive connecting the relatively small diameter pulley pair constituting the output of the step pulley assembly 46 with a pulley pair 52 mounted coaxially with the head stock spindle 20. Pulley 52 is selectively connectable to the spindle 20 directly or through back gearing under control of control lever 23 (Figure 1) as is fully illustrated and described in said first mentioned copending application.

Referring to Figures 2, 4 and 5, the V-belt, vari-speed pulley assembly 40 comprises a pair of outer elements 54 and 56, having opposed V-belt engaging segmental conical faces 58 and 60 respectively, and an intermediate member 62 having V-belt engaging segmental conical faces 64 and 66 cooperatively opposed to the faces 58 and 60 respectively. The three members 54, 56 and 62 are mounted upon a sleeve 68. Members 54 and 56 are press fitted on the opposite ends of and rotationally and axially fixed to sleeve 68 by screws 69. Member 62 is mounted intermediate members 54 and 56 for axial displacement along sleeve 68 between said members and is non-rotatably connected thereto by a key 69a fixed to sleeve 68 and engaging an axially extending slot 69b in the bore of member 62. Member 62 is formed with axially extending hubs 70 and 72, hub 70 fully interfitting with an aligned bore in member 54 when member 62 is in its extreme left position, as viewed in Figure 4, and hub 72 fully interfitting with an aligned bore in member 56 when member 62 is in its extreme right position as viewed in that figure. The cylindrical outer faces of hubs 70 and 72 provide an annular base surface for the inner faces of the belts to engage when the pulley assembly 40 is so shifted that either of the belts 34 or 44 runs at the minimum pitch diameter of the pulley assembly 40.

The sleeve 68 is journalled by spaced bearing bushings 74 and 76 upon the shaft 42 and is axially fixed thereon between fibre wear rings 79 and 81 abutting the shoulder 78 integral with shaft 42 and a retaining ring 80 respectively. The bushings 74 and 76 are formed preferably of porous bronze impregnated with oil and graphite. Lubricant is introduced into the annular chamber between the adjacent ends of bushings 74 and 76 through a channel 75 formed of porous bronze, mounted in apertures through the wall of sleeve 68 permit controlled lubrication of the engaged faces of sleeve 68 and member 62.

Members 54, 56 and 62 and sleeve 68 constitute a subassembly which is journalled and, in manufacturing assembly, balanced as a unit upon shaft 42.

The shaft 42 is fixed upon and supported by a movable support or pivoted bracket 82, its right end being received in a split boss type clamp formed integral with bracket 82 and clamped therein by screws 83. Bracket 82 is fixed to a shaft 84 by set screws 85 and pivotally and axially slidably mounted thereby on a fixed support or mounting bracket 86 rigidly secured to an interior channel shaped rear wall member 88 of the pedestal 16.

Variations in the speed of the drive mechanism are effected by laterally displacing the shaft 42 and the pulley assembly 40 thereon about the axis of shaft 84 under control of the hand wheel 24 to effect modification of the pitch diameter ratio between the input side (formed by members 54 and 62) and the output side (formed by members 56 and 62) of the vari-speed pulley assembly 40. The mechanism by which this controlled lateral displacement movement of pulley assembly 40 is effected will now be described in reference to Figures 2 and 3.

The shaft 26, to which the hand wheel 24 is fixed, is journalled at its forward end in the front wall of pedestal 16 and at its rear end in a depending fixed mounting bracket 90, the details of which are best shown in Figures 9 and 10. Bracket 90 is fixed to the underside of frame 11. The bevel gear 92, which is fixed to the rear end of shaft 26, is in constant mesh with a bevel gear 94 fixed to the upper end of a downwardly extending shaft 96 which is journalled in and axially supported by a boss 97 on block 90 and journalled in a boss 98 on the mounting bracket 86. The lower end of shaft 96 below boss 98 is externally threaded and engages a centrally located threaded hole through a transverse pin 100 (see also Figures 4 and 8) which is mounted for pivotal and axial sliding movement in diametrally aligned bores through side walls of an axially short tubular member 102 which in turn is pivotally connected to the pivoted bracket 82 between spaced bosses 104 and 106 by conical end pivot screws 107 and 108 fixed in position by lock nuts 109. The pivot axis of member 102 relative to bracket 82 formed by screws 107 and 108 is parallel to the pivot axis of pin 100 relative to the member 102 and to the axis of shaft 42.

Bracket 82 is resiliently biased in a clockwise direction about the axis of shaft 84 as viewed in Figure 3 by a compression spring 110 compressed between and retained by spring retaining lugs 112 and 114 located respectively on the underside of mounting bracket 86 and the upper side of pivoted bracket 82.

In operation, rotation of the shaft 26 imparts rotation of shaft 96 through the meshed bevel gears 92 and 94. Rotation of shaft 96, depending upon the direction of rotation thereof and acting through the threaded connection between pin 100 and shaft 96, imparts upward or downward movement to the pin 100 and, through the double pivot connection between pin 100 and pivoted bracket 82 formed by the tubular member 102, imparts counterclockwise or clockwise movement to the bracket 82 about the axis of shaft 84. Adjustment of the lateral position of vari-speed pulley assembly 40 in this manner to effect variations in the spindle speed is always made while the drive train is running.

As is best shown in Figure 2, the shaft 84 to which the pivoted bracket 82 is fixed, is mounted through aligned bores in the spaced side walls 116 and 118 of the mounting bracket 86. The side walls 116 and 118 are spaced apart slightly farther than the width of the pivoted bracket 82 at the point in which it is mounted on the bracket 84 to permit limited displacement of shaft 84 and the bracket 82 between the two side walls 116 and 118 of the mounting bracket 86 in the direction axially of the shaft 84. Since shafts 42 and 84 are parallel, this limited movement is in the direction to impart limited axial movement to the shaft 42 upon which the vari-speed pulley assembly 40 is mounted. This movement of bracket 82 is of such an extent and so controlled concomitantly with the lateral displacement of the shaft 42 to effect speed variations that proper alignment of belts 34 and 44 relative to pulleys 36 and 46, respectively, is maintained. By proper alignment, as used herein, it is meant that the path in which the belt runs is normal to the axes of the pulleys in which it engages.

The displacement of the pivoted bracket 82 between the walls 116 and 118 of mounting bracket 86 is controlled by the coaction of pin or cam 120, fixed at its lower end to the pivoted bracket 82, with a cam groove 121 (see Figures 6 and 7) formed through the top wall of mounting bracket 86. As is best shown in Figure 5, the axis of pin 120 intersects the axis of shaft 84 and is substantially normal to the plane defined by the axes of shafts 42 and 84. The cam groove 121 (Figures 6 and 7) is formed through the top wall of the mounting bracket 86 and extends from the front right of the top wall of bracket 86 as viewed in Figure 6 toward the rear left of that top wall. The longitudinal center line of this groove is of such inclination relative to a plane normal to the axis of shaft 84 and of such length to so control the position of pin 120, as the bracket 82 is pivoted about the axis of shaft 84, that the assembly comprising bracket 82, shaft 84, shaft 42 and pulley assembly 40 is displaced in the direction of the axis of shaft 42. The rate of displacement of this assembly is such that as the belt 34 moves down the belt engaging faces 58 and 64 and the belt 44 moves up the belt engaging faces 60 and 66, these belts are, at all times, maintained in proper alignment with the pulleys 36 and 46 respectively. The center line of the cam groove 121 is in the form of a helix relative to the axis of shaft 84, the helix angle in the disclosed embodiment being 12½° relative to that axis and the groove 121 being generated at that helix angle about the axis of shaft 84. The axially sliding connection between pin 100 and tubular member 102 accommodates the displacement of bracket 82 relative to shaft 96 while maintaining the pivotal connection in the drive impart in pivotal movement to bracket 82.

The mechanism thus described, which assures proper belt alignment through axial displacement of the vari-speed pulley assembly 40 throughout the range of speed variation resulting from lateral displacement of that assembly, also functions through pin 120 and cam groove 121 to resist axial shifting of bracket 82, and shafts 84 and 42 under influence of variations in tension of belts 44 and 34 resulting from cutting stresses tending to vary the headstock spindle speed which in prior vari-speed pulling structures caused "hunting" or periodic high frequency axial movement of pulley element 62 with consequent slapping noise, fluctuations from selected speed and belt wear. Due to the screw connection between shaft 96 and the pin 100, this linkage, laterally positioning pulley assembly 40, is non-overrunning, that is once pulley assembly 40 has been laterally positioned under control of hand wheel 24, it will remain in selected position without the need of a locking mechanism but may be readily and rapidly further adjusted by manipulation of the hand wheel 24.

The spindle speed selected by manipulation of hand wheel 24 is, as has been previously pointed out, indicated by the relative position of the indicator pointer 30 relative to the scale 28 as controlled by the rotation of shaft 32. The rotative position of shaft 32, which is journalled at its rearward end in depending bracket 90 and at its forward end in the front wall of the column 16, is controlled by the position of the pivoted bracket 82 which is connected to the shaft 32 through a link 122 of L-shaped configuration which at its lower end is fixed to a pin 124 that is pivotally mounted within a bore in the right end wall of pivoted bracket 82 as is best shown in Figure 2. The short leg of link 122 extends through a diametral bore 126 through the lower end of a rack 128 mounted for vertical longitudinal displacement in spaced apertured bosses 129 on the bracket 90 and meshing with a pinion 130 fixed to the rear end of the shaft 32. Through this linkage upward movement of the pivoted link 82 imparts upward longitudinal displacement of the rack 128 and clockwise rotation of the indicator shaft 32 as viewed in Figure 2 and downward displacement of the pivoted bracket 82 produces downward longitudinal displacement of the rack 128 and anti-clockwise rotation of the indicator shaft 32.

As is best shown in Figures 2 and 3, the drive motor 22 is supported upon a mounting plate 134 which has fixed to the rear thereof a U-shaped bracket 135 which straddles the sides of the channel shaped interior wall member 88. Plate 134 is pivoted upon wall member 88 by conical end pivot screws 136 engaging the opposite ends of a shaft 137 which extends through and is fixed to the side walls of interior wall member 88. The pivot axis of plate 134 is parallel to the axes of shafts 38 and 42 and of the motor 22. Mounting plate 134 is resiliently supported at the opposite sides of its free end between opposed upper and lower compression springs 138 and 140 which surround threaded spring retaining lugs 142 above and below the suitably apertured plate 134 and which are compressed against plate 134 by lock nuts 139 and 141 respectively. The lugs 142 are suitably fixed to the bottom of the support pedestal 16.

By this construction, the motor 22 and plate 134 may be pivoted upwardly against the force of spring 138 to relieve the tension on belt 34 without disturbing the adjustments of nuts 139 and 141 which determine the normal position of motor 22. The tension upon belt 34 during normal operation is, therefore, at all times determined by cooperative adjustment of nuts 139 and 141.

As is apparent from Figures 2 and 3, the second intermediate pulley assembly, known as a jack shaft idler pulley, is relatively inaccessably located closely adjacent the underside of the base 11. This location is necessary to provide the proper speed reduction between the motor shaft 38 and the spindle 20, particularly required in metal cutting machines, and is of necessity relatively inaccessible and out of view of a service man, if the speed control mechanism hand wheel 24 is to be located for convenient manipulation by the operator.

Since pulley assembly 46 is directly connected to the spindle mounted drive pulley 52, by belts 50, these belts are subjected to heavy loads resulting in relatively rapid wear and requiring replacement of these belts from time to time. The present invention provides an improved mounting for pulley assembly 46 which facilitates initial assembly of the drive train and permits removal and remounting of this unit for belt replacement purposes. in spite of its inaccessibility and out of sight location, in a fraction of a minute as compared with the 15 to 20 minutes heretofore required for assembly of the structure originally provided by the Reibig invention of application Serial Number 541,921 aforesaid.

This improved mounting structure for the second intermediate pulley assembly 46 will now be described in detail in reference to Figures 9 and 10.

The shaft 48 is mounted upon the depending mounting bracket 90 by an attachment bracket 144, shaft 48 being received within a bore 146 formed through bracket 144 and fixed therein by dowels 148. The pulley assembly 46 is a step type pulley, being provided with a relatively large belt receiving groove 150 in which belt 44 is received and a pair of like diameter belt receiving grooves 152 and 154 in which the driven belts 50 are received. Pulley assembly 46 is journalled upon shaft 48 by spaced bearing bushings 156 and 158 which are preferably formed of porous bronze impregnated with graphite and oil. Supplemental lubrication is provided by the introduction of oil through the oil cup 160, and lubricant transmission channel 162 formed axially through the shaft 48 and intersecting with a diametral passage 164 to permit introduction of oil into the annular space about the shaft 48 between the bushings 156 and 158. Pulley assembly 46 is received on shaft 48 between fiber wear strips 166 and 168 and retained axially between the end face of the boss 170, formed upon the bracket 144 coaxial with the bore 146, and a snap ring 172.

The bracket 144 is fixed to the depending mounting bracket 90 by a pair of screws 174 and 176 which are received through apertures in bracket 144 and which are threadedly engaged with the end wall 177 of the bracket 90. As is most clearly shown in Figure 10, the apertures in which the screws 174 and 176 fit are of L-shaped configuration having one portion extending in the direction of the plane of the axes of shaft 48 and spindle 20 and another portion opening through the side wall of the bracket 144 so that after blind loosening the screws 174 and 176, by lifting the bracket 144 upward slightly from the position shown in Figure 10 and sliding it to the right the bracket 144 can easily be removed from its mounting member 90 without removal of the screws 174 and 176. A further screw 178 is threadedly received through the bottom of bracket 144, being so mounted that its axis is perpendicular to the axis of screw 176 and extending in the direction of the first described slot portion and abuts the shank of the screw 176 in assembly. The structure as shown in Figure 10 is in assembled position with the screw 178 properly tightened against the screw 176 to pull the bracket 144 down sufficiently to properly tension the belts 50 (shown in Figure 9). If adjustment of the tension of the belts 50 is desired, the screws 174 and 176 are loosened slightly, and the screw 178 manipulated to pull the bracket 144 down to tension the belts 50 or manipulated to permit the bracket 144 to rise slightly to decrease the tension on the belts 50.

When it is desired to remove the pulley assembly 46 to replace belts 50, the screw 178 is backed off sufficiently to permit, after loosening of the screws 174 and 176, the upward movement of the bracket 144 sufficiently to align the shanks of the screws 174 and 176 with the side opening slot portions of the apertures in which they are received. With the bracket 144 lifted to this position, it may now be moved to the right as viewed in Figure 10, that is toward the front of the machine and thus removed from its mounting member 90. The belts may then be removed after they are disengaged from the spindle mounted pulleys 52.

In mounting this pulley unit, it is merely necessary after engaging it with belts 50, to place the unit to the right of the screws 174 and 176, as viewed in Figure 10, slide the bracket to the left so that the screws 174 and 176 pass into their respective slotted apertures, tighten the screw 178 against the screw 176 to properly tension the belts 50 and tighten the screws 174 and 176 to lock the bracket 144 in its adjusted position on the member 90.

Referring to Figures 2 and 3, the overall operation by which the pulley assembly 46 is removed will now be described. In order to remove the pulley assembly 46, the vari-speed pulley assembly 40 is lifted by manipulation of the hand wheel 24 from the position in which it is shown in Figures 2 and 3 and the motor 22 is lifted about its pivot screws 136 to relieve the tension on the belt 34 which in turn is effective to relieve the tension on belt 44. With the pulley assembly 42 in an upwardly adjusted position, the belt 44 can be disengaged from the groove 150 on pulley assembly 46. When the screws 174 and 176 have been loosened slightly, and the belt tensioning screw 178 backed off to relieve the tension on the belts 50, the assembly comprising the bracket 144, the pulley assembly 46 and the shaft 48 on which it is journalled can be removed from the mounting screws 174 and 176 and disengaged with the belts 50 as described in detail above.

In assembling the mechanism, after repair or replacement of the pulley assembly or belts 50, the assembly comprising the bracket 144, the pulley assembly 46 and the shaft 48 is engaged with the belts 50, the bracket 144 is placed in position on the mounting screws 174 and 176 as has been previously described and the belts 50 tensioned by tightening screw 178 against screws 176, and the screws 174 and 176 tightened to lock the bracket 144 in position. The belt 44 may then be placed in its running position within the groove 150 of the step pulley 46 and the motor 22 returned to its original position as determined by the opposed compression springs 138 and 140. The vari-speed pulley assembly 40 is then positioned for the desired speed through manipulation of the hand wheel 24.

Figures 11 through 15 illustrate a modified form of the lathe drive train of the present invention particularly adapted for use in and disclosed as a part of a wood cutting lathe. In overall structure the lathe is similar to that shown in Figure 1. Referring to Figure 11, it is seen that the lathe comprises a head stock 200 mounted upon a suitable base casting 202 supported upon a cabinet-like pedestal 204 in a manner similar to that shown in the lathe illustrated in Figure 1. The head stock 200 is provided with a rotatably mounted head stock spindle 206 and a head stock spindle pulley 208. The head stock spindle pulley 208 is driven from a motor 210 by a two stage belt drive. The two stage belt drive is formed by a pulley 212 fixed to the rotor shaft of the motor 210, a vari-speed pulley assembly 214, best shown in Figure 12, a drive belt 216 interconnecting pulleys 212 and 214, and a drive belt 218 drive connecting the vari-speed pulley assembly 214 with the spindle mounted pulley 208.

As in the previous embodiment, the vari-speed pulley assembly 214 is mounted for concomitant lateral and axial displacement to effect variation in the speed reduction ratio between the drive motor 210 and the spindle 206 while maintaining proper alignment of the belts 216 and 218 and is positioned by a non-overrunning mechanism under control of a hand wheel 220 (Figure 11) so that it will maintain its adjusted position without being locked in that position by a separate locking mechanism.

As is most clearly shown in Figs. 11 and 12, the motor 210 is fixed to a mounting plate 222 that is pivoted by opposed conical pivot screws 224 and 226 and fixed by lock nuts 234 and 236. The bracket 232 is attached by machine screws 238 to an intermediate casting 240 that is secured to the base casting 202 by machine screws 242. A plate 244 formed in its opposite ends with a plurality of aligned pairs of conical recesses 246 is fixed at its lower end to the motor mounting plate 222 and forms a link connecting the plate 222 to the pivot screws 224 and 226. The pivot axis of the motor 210 formed by the screws 224 and 226 may be adjusted relative to the axis of the motor 210 by selectively engaging the end of the screws 224 and 226 with any of the opposed pairs of recesses 246.

The opposite end of the motor mounting plate 222 is resiliently supported from the opposite end of the bracket 232 by a pair of upstanding threaded studs 248 fixed at their lower end to opposite sites of the free end of the plate 222 and extending through apertures 250 in the bracket 232. The plate 222 is resiliently supported between opposed upper and lower compression springs 252 and 254 surrounding stud 248 and compressed against the opposite faces of the bracket 232 by lock nut pairs 256 and 258 respectively. The normal position of motor 210 about its pivot is determined by the adjusted positions of the lock nut pairs 256 and 258.

Referring to Figure 12, the vari-speed pulley assembly is formed by a pair of outer members 260 and 262 that are fixed to a shaft 264 by pins 266 and 268, and an intermediate member 270 mounted on the shaft 264 for axial displacement therealong intermediate the members 260 and 262. The members 260 and 262 are formed on their adjacent faces with opposed frusto-conical faces 272 and 274 which cooperate respectively with frusto-conical faces 276 and 278 to provide V-shaped grooves to receive the belts 216 and 218 respectively. The members 260 and 262 on their adjacent faces are provided with ribs 280 alternating with intermediate recesses 282 which engage complementary ribs 284 and recesses 286 on the intermediate member 270, in a manner similar to the coaction of the teeth of a jaw clutch, by which member 270 is non-rotatably connected to the members 260 and 262 and is freely axially slidable between extreme positions of abutting engagement with these two fixed members.

The shaft 264 is rotatably mounted in boss 288 formed integral with a sliding support member 290. The axis of shaft 264 is parallel to the axes of the rotor of motor 210, the pivot formed by the screws 224 and 226 for the motor 210, and to the axis of the spindle and spindle mounted pulley 208.

The sliding member 290 is connected to the machined casting 240 by a dove tail slide connection, a dove tail slide 292 being formed on the casting 240 and a cooperating dove tail groove being formed through the member 290. The rectilinear path of movement of the sliding member 290 relative to the dove tail slide 292 is in a vertical plane normal to the projection plane of Figure 13 and inclined from a vertical plane normal to the section plane of Figure 14 as is apparent from Figure 14. The inclination of the dove tail slide, as shown in Figure 14, provides axial displacement of the shaft 264 and the pulley assembly 214 mounted thereon concomitantly with its lateral displacement upon movement of the sliding member 290 along the dove tail slide 292.

The movement and position of the sliding member 290 along the dove tail slide 292 is controlled by manipulation and the position of the hand wheel 220 (Figure 11) through a linkage which will now be described.

Referring to Figure 11, the hand wheel 220 is fixed to the outer end of a shaft 294 that is journalled at its forward end by a bearing 296 and its rearward end within a bore 298 in the casting 240. As is most clearly shown in Figures 13, 14 and 15, the rearward end of the shaft 294 is formed with helical gear teeth 300 which mesh with a helical pinion 302 received within a recess 304 (Figure 14), in the bottom wall of the casting 240. The helical pinion 302 is fixed to an externally threaded shaft 306 which is journalled in the casting 240 at 308 and 310 and which extends through a relatively large recess 312 formed in casting 240 through the outer face of the dove tail slide 292. A slide nut member 314 is threadedly received on the externally threaded portion 307 of shaft 306 within the recess 312 and is fixed to the sliding member 290 by a screw 316.

By this construction, rotary manipulation of the shaft 294 and the integral gear 300 in one direction, under the control of the hand wheel 220, will produce rotation of the pinion 302 and shaft 306 to advance the nut 314 upwardly along the threaded portion 307 of the shaft 306 and thereby advance the sliding member 290 upwardly along the dove tail slide 292. This is effective to produce upward displacement of the pulley assembly 214 and leftward axial displacement thereof as viewed in Figure 12 thereby reducing the pitch diameter of the belt 216 relative to the pulley assembly 214 and increasing the pitch diameter of belt 218 relative thereto while maintaining proper alignment of these belts relative to the pulleys 212 and 208 respectively.

Conversely rotation of the shaft 294 and the integral helical gear 300 under control of the hand wheel 220 in the opposite direction will produce an opposite direction of rotation of the pinion 302 and the shaft 306 thereby causing the nut 314 to advance downwardly along the threaded portion 307 of the shaft 306 and downward movement of the pulley assembly 214 and the shaft 264. This downward movement imparts concomitant axial displacement of the pulley assembly 214 to the right as viewed in Figure 12 to again maintain proper alignment of the belts 216 and 218 relative to the pulleys 212 and 208 respectively as the pitch diameter of the belt 216 is increased relative to the pulley assembly 214 and the pitch diameter of the belt 218 is decreased relative to that pulley assembly.

The helix angle of the screw 307 is such as to provide a non-overrunning connection between the nut 314 and the shaft 306. Once the pulley assembly 214 has been positioned under control of the hand wheel 220 it will remain in position but further positioning of the pulley assembly may be effected merely by adjustment of the hand wheel 220.

Figures 16 illustrates a modified and preferred form of the motor mount of the drive train illustrated in Figures 11–15.

In this form of motor mount, the motor 210 is secured by bolts 330 upon the top of a motor mounting plate 332 which is mounted for upward and downward belt tension adjusting translatory movement along a vertically extending tubular column 334. A column 334 is received in a bore 336 of a motor plate hanger member 338 and fixed therein by set screws 340. Hanger member 338 is fixed to member 240 by screws 238 (not shown in Figure 16) in the same manner as bracket 232 is fixed thereto in the embodiment illustrated in Figures 11–15. Mounting plate 332 is provided with a bore 342 in which column 334 is slidably received and is fixed to column 334 by a set screw 344. The vertically adjusted position of mounting plate 332 along column 334 is controlled, while set screw 344 is loosened, by manipulation of a jack screw 346 which extends parallel to the column 334, which is threadedly engaged with a collar 347 that is received upon and fixed to column 334 by spaced set screws 348, and the head of which abuts a shoulder 350 integral with plate 332.

In this preferred form of the motor mount for the drive train illustrated in Figures 11–15, the motor is rigidly supported relative to the frame of the lathe and is mounted for controlled vertical movement to effect adjustment of the tension of belts 216 interconnecting the motor 210 with a various speed fully assembly 214 by the manipulation of jack screw 346.

From the foregoing detailed description of my invention it is apparent that I have provided noiselessly operating, long life variable speed drive trains of the V-belt type for both metal cutting and wood working lathes capable of maintaining a selected one of an infinite number of speeds within a predetermined range which may be easily and rapidly adjusted and serviced without misalignment of the belts.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a machine tool having a drive motor, a spindle and a spindle drive member coaxial with said spindle and drive connectable thereto; a multiple stage V-belt type variable speed drive train interconnecting said drive motor and said member comprising a vari-speed pulley assembly; a first means, including a drive pulley driven by said motor and a first belt engaging said drive pulley and said pulley assembly, drive connecting the input side of said pulley assembly to said motor; a second means, including an intermediate pulley and second and third belts connecting the output side of said pulley assembly to said drive member through said intermediate pulley; a third means pivotally mounting said pulley assembly about an axis in spaced parallel relation to the axes of said motor and said spindle for concomitant lateral and axial displacement of said axis along a pre- determined path such that the proper alignment of said first and second belts and axial positioning of said pulley assembly is maintained throughout the range of displacement of said axis; and a fourth means manipulatable by the machine operator for correlating the lateral and axial displacement of said axis and selectively positioning said axis along said path to provide an infinite speed adjustment within a predetermined range while assuring a uniform speed variation for the same increment of adjustment throughout the full adjustment range, a rigid support, means for rigidly detachably mounting said intermediate pulley upon said support at a position inaccessible to visual inspection, said mounting means comprising a mounting member formed with a plurality of slots, each having a first portion extending in the direction of the plane of the axes of said spindle and said intermediate pulley and a second portion opening through an exterior side wall of said member, and a screw received in each said slot and threadedly connected to said support whereby said member can be disengaged from said screws through the second portions of said slots while said screws remain threadedly engaged with said support and whereby said screws when in said first slot portions may be tightened to clamp said member rigidly to said support.

2. The structure defined in claim 1 together with means mounted on said member and abutting one of said screws when in the said first slot portion in which it is received and selectively manipulatable to displace said screws relative to said member along said first slot portions to adjust the tension of said second belt.

3. In combination with a multiple stage V-belt type drive train having a driven pulley, a driving pulley, and an intermediate multiple groove pulley, all said pulleys being journalled about spaced parallel axes and said intermediate pulley being located in a position inaccessible to visual inspection, and a pair of V-belts received in separate grooves of said intermediate pulley and drive connecting said intermediate pulley with said driving and driven pulleys respectively, a rigid support, means for rigidly detachably journalling said intermediate pulley upon said rigid support comprising a shaft rotatably carrying said intermediate pulley, a mounting member fixed to said shaft and formed with a plurality of slots, each having a first portion extending in the direction of the plane defined by the axes of said intermediate pulley and one of the other of said pulleys and a second portion opening through an exterior sidewall of said member, and a screw received in each such slot and threadedly connected to said support whereby said member can be disengaged from said screws through the second portions of said slots while said screws remain threadedly engaged with said support to permit detachment of said member from said support for belt replacement purposes and whereby said screws when in said first slot portions may be tightened to clamp said member rigidly to said support.

4. The structure defined in claim 3, together with means mounted on said member and abutting one of said screws when in the said first slot portion, in which it is received and selectively manipulatable to displace said member relative to said screws along said first slot portions to adjust the tension of at least one of said belts.

References Cited in the file of this patent

UNITED STATES PATENTS

| Number | Name | Date |
| --- | --- | --- |
| 2,035,269 | Judelshon | Mar. 24, 1936 |
| 2,237,511 | Tautz | Apr. 8, 1941 |
| 2,267,238 | Irwin | Dec. 23, 1941 |
| 2,312,985 | Bales | Mar. 2, 1943 |
| 2,369,336 | Cable | Feb. 13, 1945 |
| 2,433,150 | Palm | Dec. 23, 1947 |
| 2,649,811 | Noe | Aug. 25, 1953 |
| 2,695,529 | Evans | Nov. 30, 1954 |